Oct. 13, 1942.      L. D. SOUBIER ET AL      2,298,728
BOTTLE BLOWING APPARATUS
Filed Jan. 10, 1939          13 Sheets-Sheet 7

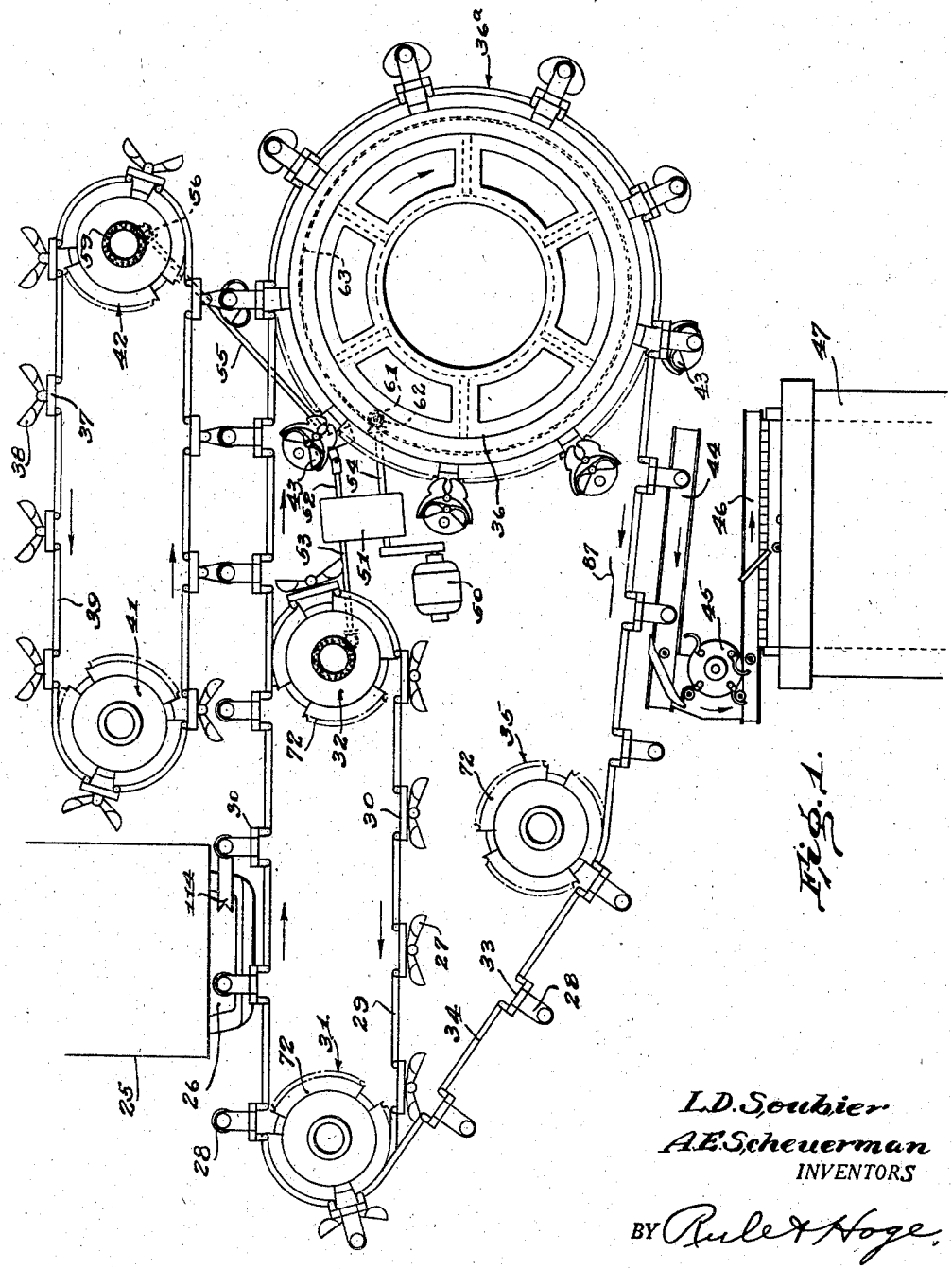

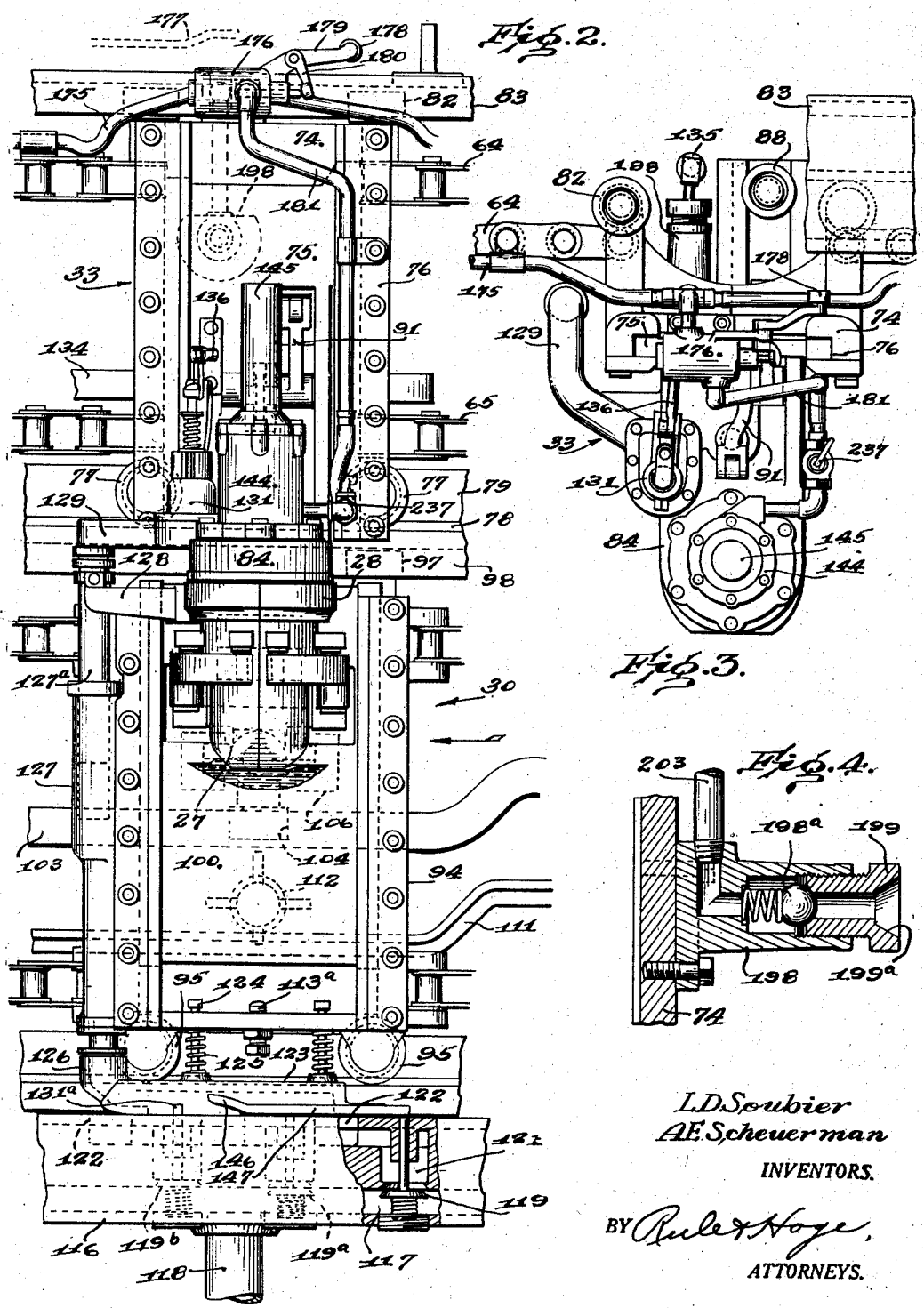

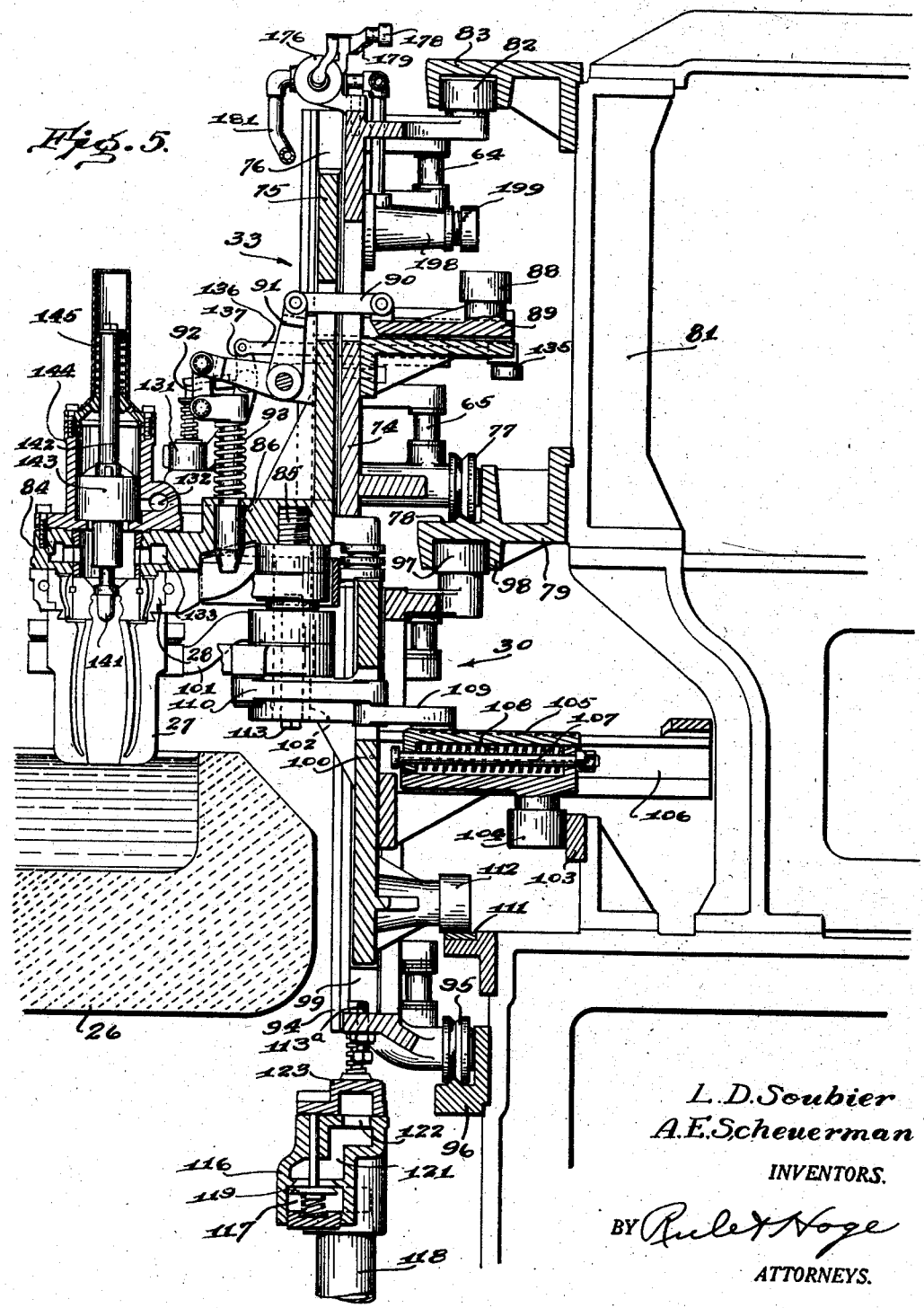

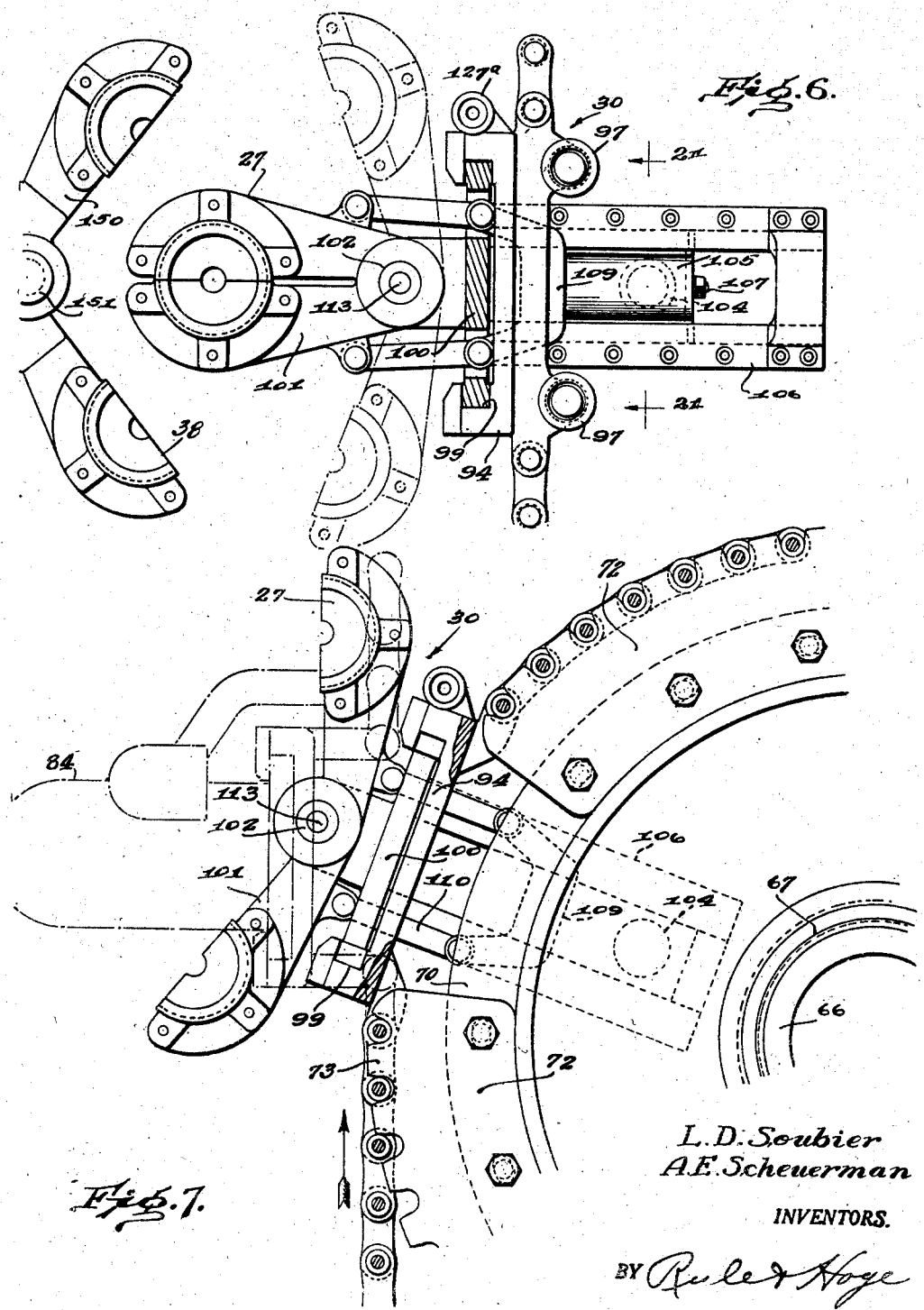

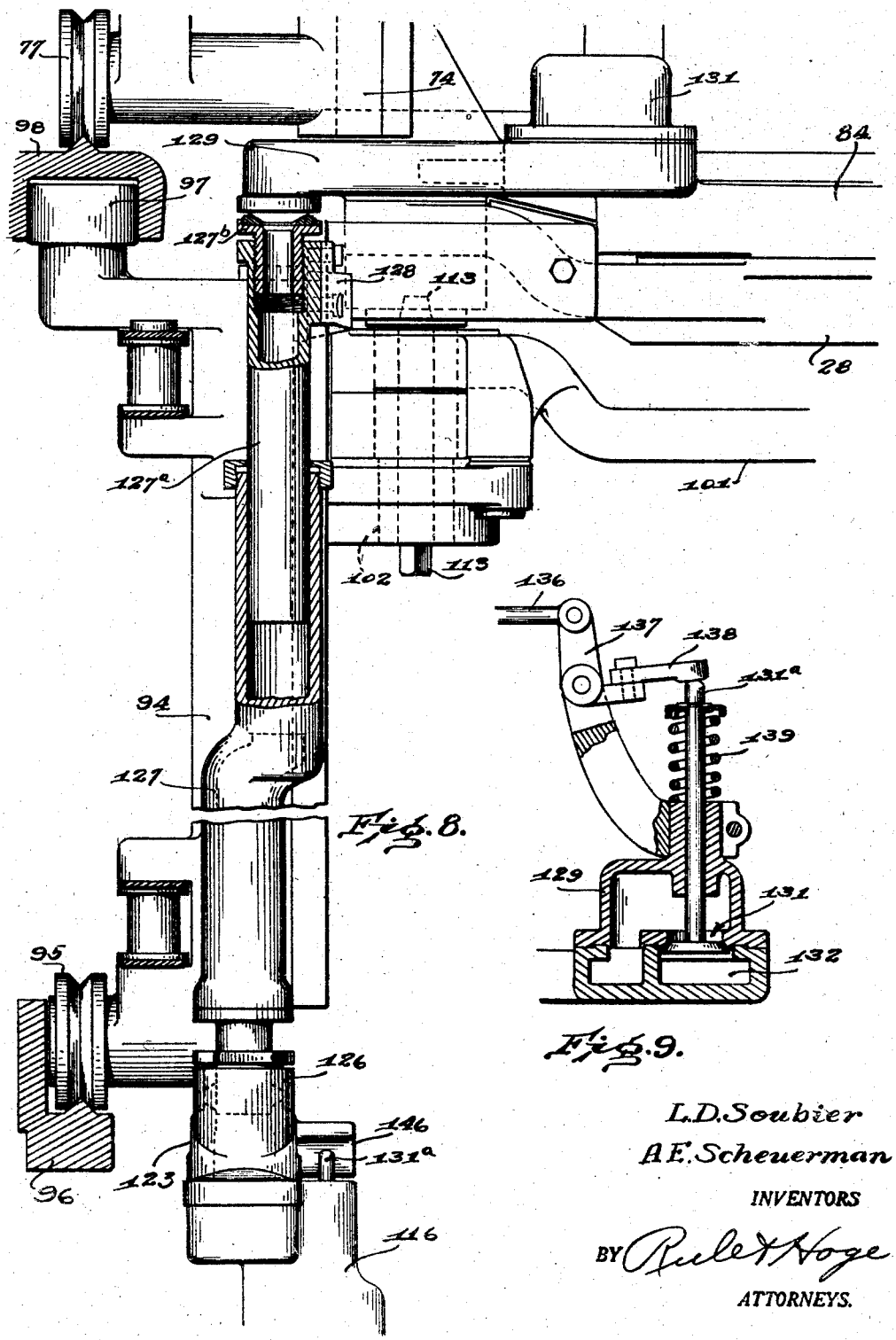

*Fig. 12.*

L. D. Soubier
A. E. Scheuerman
INVENTORS

BY Rule & Hoge
ATTORNEYS.

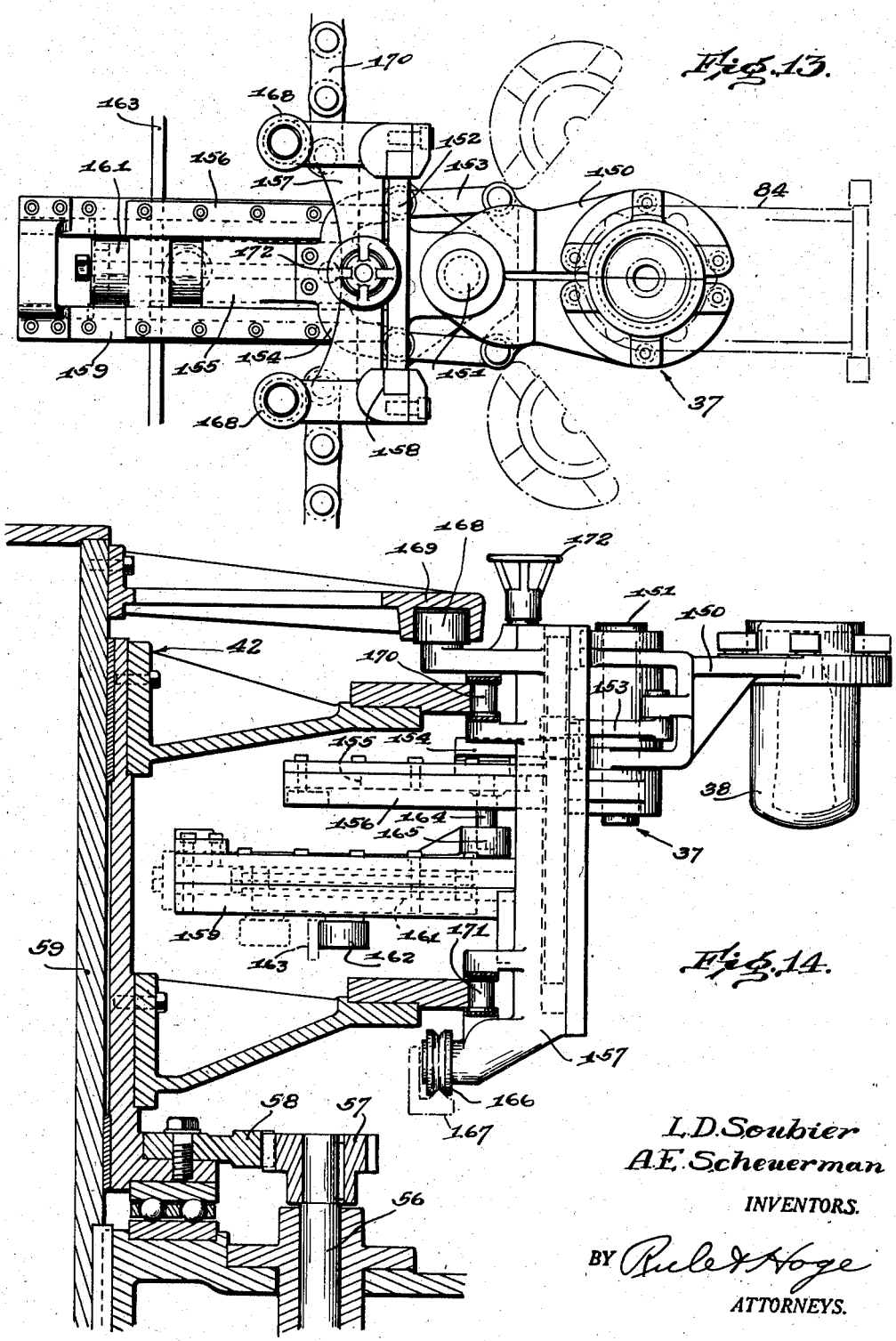

Oct. 13, 1942.  L. D. SOUBIER ET AL  2,298,728
BOTTLE BLOWING APPARATUS
Filed Jan. 10, 1939  13 Sheets-Sheet 9
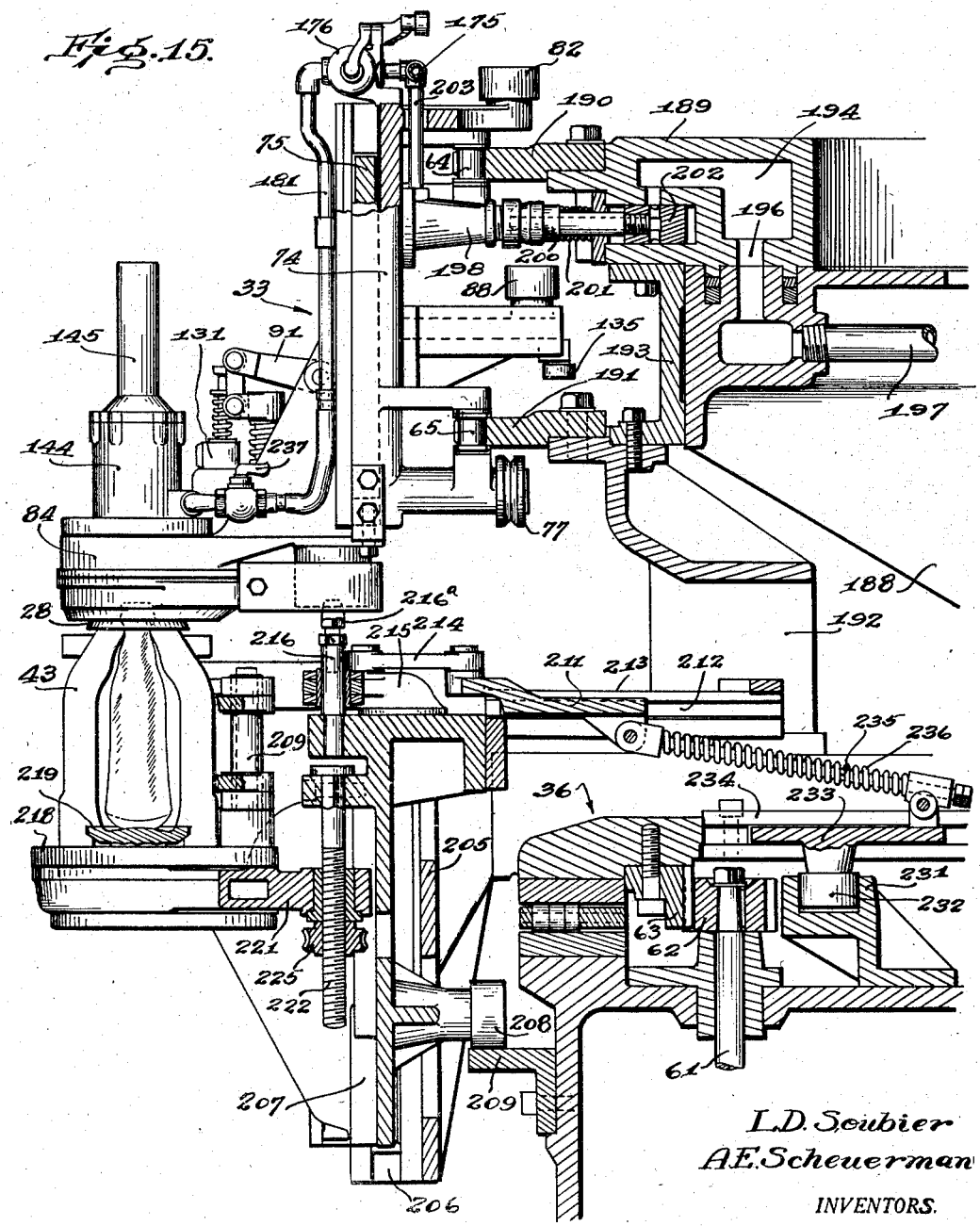
L.D. Soubier
A.E. Scheuerman
INVENTORS.
BY *Rule & Hoge*
ATTORNEYS.

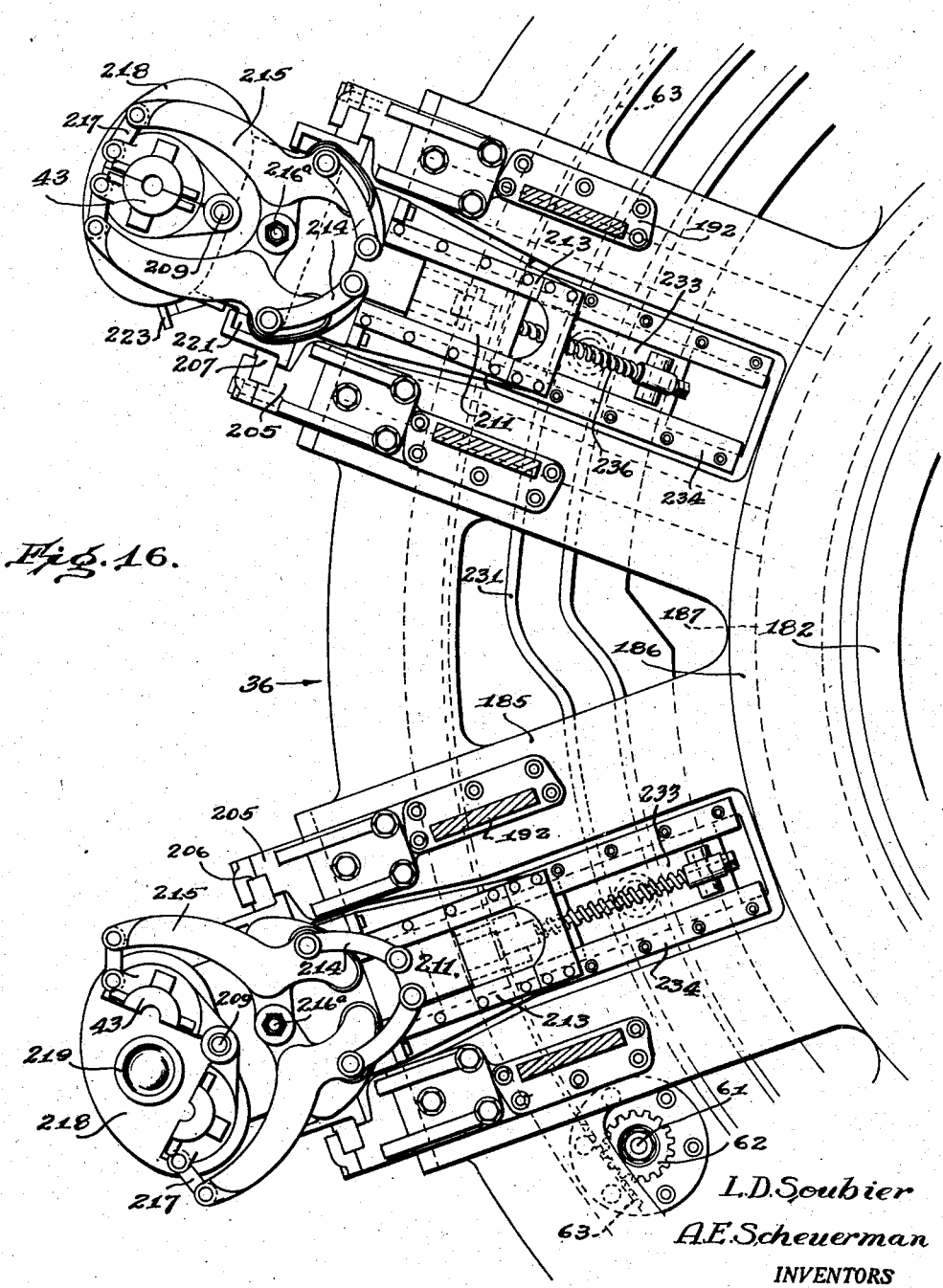

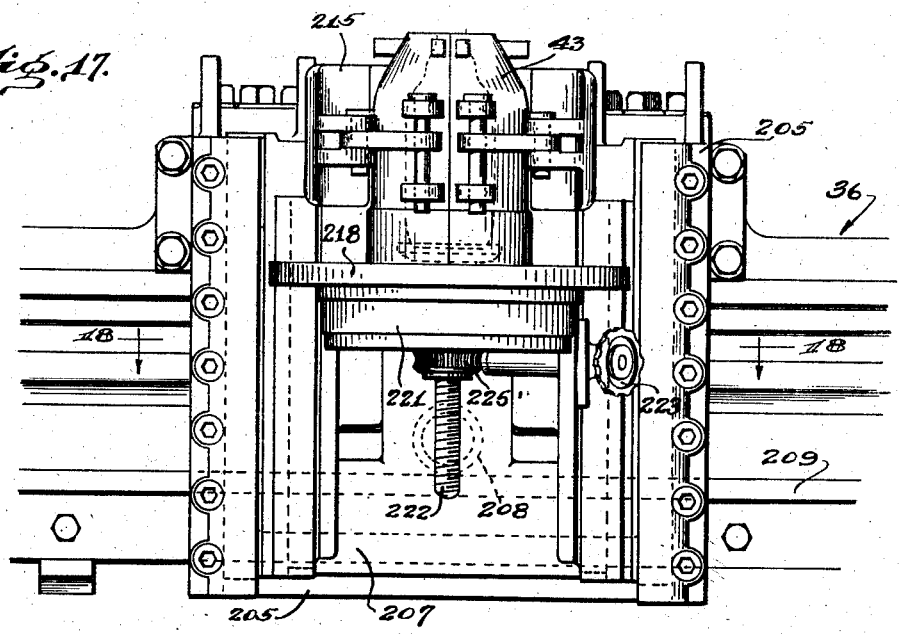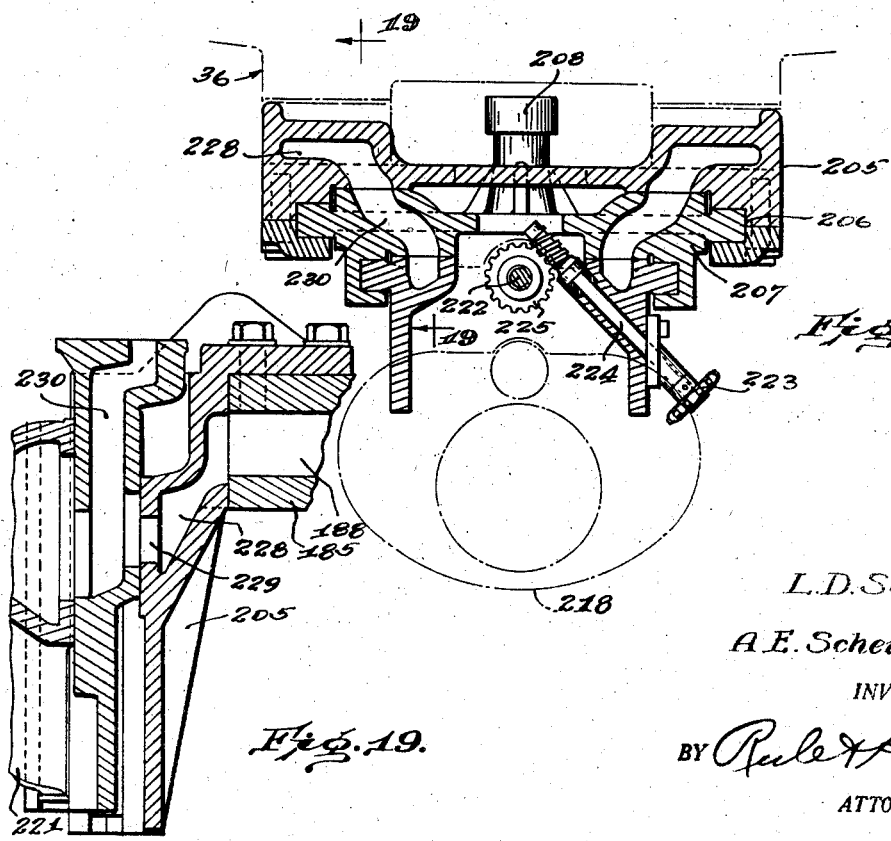

Oct. 13, 1942.   L. D. SOUBIER ET AL   2,298,728
BOTTLE BLOWING APPARATUS
Filed Jan. 10, 1939   13 Sheets-Sheet 12

L. D. Soubier
A. E. Scheuerman
INVENTORS.

BY
ATTORNEYS.

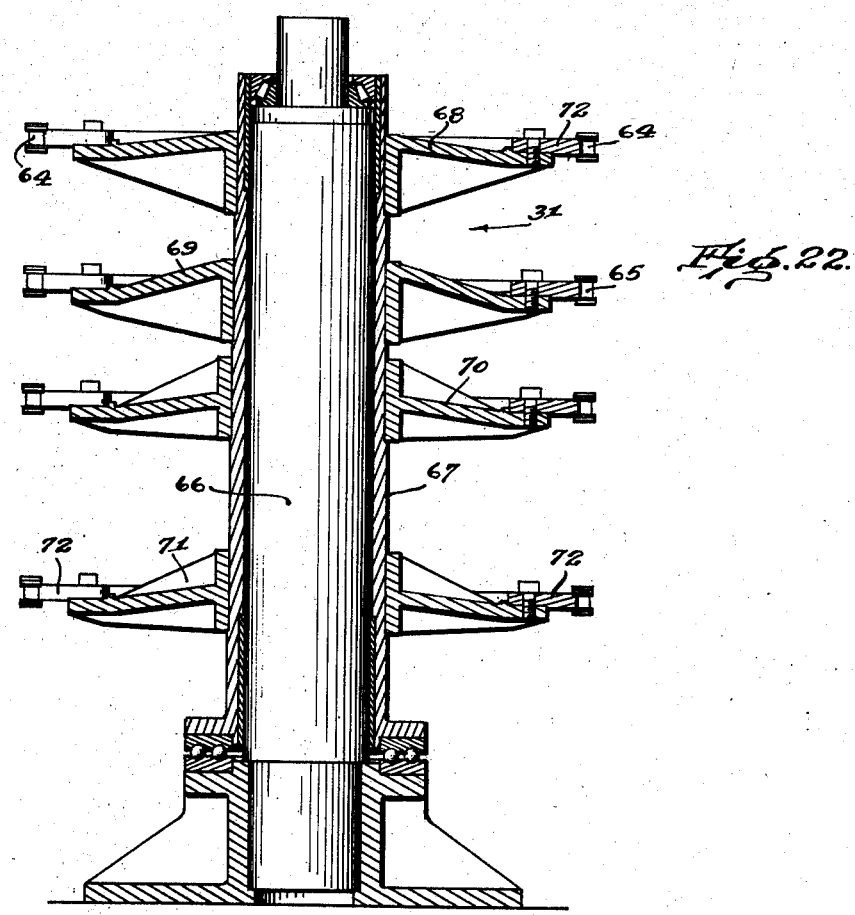
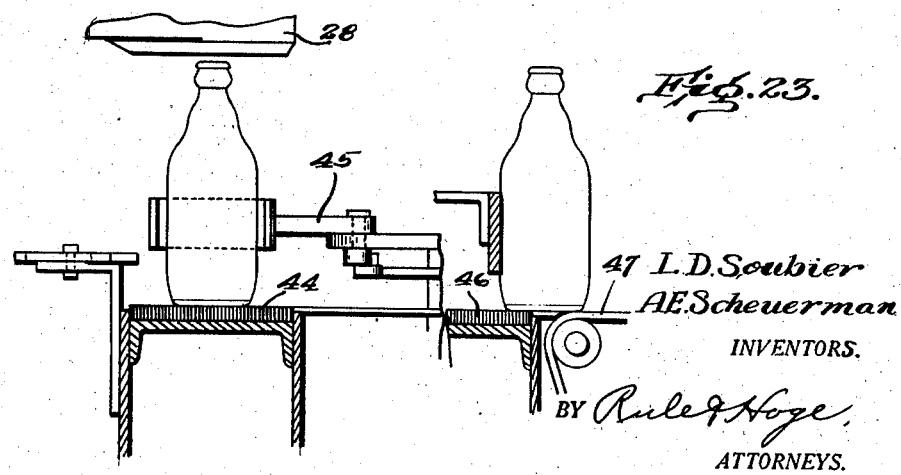

Patented Oct. 13, 1942

2,298,728

UNITED STATES PATENT OFFICE 2,298,728

BOTTLE BLOWING APPARATUS

Leonard D. Soubier and August E. Scheuerman, Toledo, Ohio, assignors to Owens-Illinois Glass Company, a corporation of Ohio Application January 10, 1939, Serial No. 250,186

17 Claims. (Cl. 49—5)

Our invention relates to apparatus for making bottles, jars and other hollow glass articles. An object of the invention is to provide an apparatus comprising a novel combination and arrangement of molds and their actuating mechanisms which permits of a high rate of production of ware of superior quality.

The invention in its preferred form comprises a series of neck molds, blank molds which periodically register with the neck molds to receive the charges of glass, intermediate molds to register with the neck molds and enclose the blanks or parisons and in which they are blown to an intermediate hollow form after they have been molded in the blank molds, and finishing molds in which the parisons are thereafter enclosed and blown to final form. Preferably blank molds of the suction gathering type are employed.

A further object of our invention is to provide an apparatus in which a blank mold, an intermediate mold, and a finishing mold register in succession with the neck mold, and in which the neck mold serves to support the parison throughout the entire operation of fabricating the glass in the molds.

A further object of the invention is to provide a novel form of apparatus of the character indicated in which the neck mold units are carried on an endless chain type of carrier, combined with means for registering blank molds and blowing molds in succession with the neck molds while the latter are traveling through predetermined portions of their circuit.

A further object of the invention is to provide an apparatus which comprises an endless chain type carrier with neck molds carried thereon, blank molds arranged to register with the neck molds and advance therewith along a predetermined portion of the neck mold circuit, intermediate molds to register with the neck molds while advancing along another portion of said circuit, and finishing molds to register with and advance with the neck molds along another portion of said circuit.

A further object of the invention is to provide a machine comprising neck molds, cooperating blank molds, intermediate molds and finishing molds, and means by which the parisons of glass are held in the neck molds while being formed successively in the blank molds, intermediate molds and finishing molds.

Other objects of the invention will appear hereinafter.

Referring to the accompanying drawings:

Fig. 1 is a diagrammatic plan view of apparatus constructed in accordance with our invention;

Fig. 2 is a fragmentary front elevation of a blank mold unit and neck mold unit, with the blank mold in dip;

Fig. 3 is a plan view of a neck mold unit;

Fig. 4 is a sectional view of a valve and connector in the air pressure line;

Fig. 5 is a sectional elevation showing blank and neck mold units with the blank mold in dip;

Fig. 6 is a part sectional plan view showing a blank mold unit and an open intermediate mold;

Fig. 7 is a plan view of a blank mold unit and a supporting and guiding means for the blank mold carrier;

Fig. 8 is a fragmentary part sectional elevation view showing part of a blank mold unit and including a portion of the vacuum line;

Fig. 9 is a fragmentary sectional elevation of a vacuum valve mechanism;

Fig. 12 is a part sectional elevation showing a neck mold unit, blank mold unit, intermediate mold unit and their cooperative relation at the time of transfer of the parison from the blank mold to the intermediate mold;

Fig. 13 is a top plan view of an intermediate mold unit;

Fig. 14 is a sectional elevation of an intermediate mold unit and supporting and driving mechanism therefor;

Fig. 15 is a part sectional elevation of neck mold and finishing mold units and the finishing mold carriage;

Fig. 16 is a fragmentary part sectional plan view showing a finishing mold carriage and finishing mold units thereon;

Fig. 17 is a front elevation of a finishing mold unit;

Fig. 18 is a section at the line 18—18 on Fig. 17;

Fig. 19 is a sectional elevation at the line 19—19 on Fig. 18;

Fig. 22 is a sectional elevation of a stationary column and rotary supporting means for the neck mold and blank mold conveyor chains; and Fig. 23 is a fragmentary view showing mechanism for transferring bottles to the leer.

Figure 10:
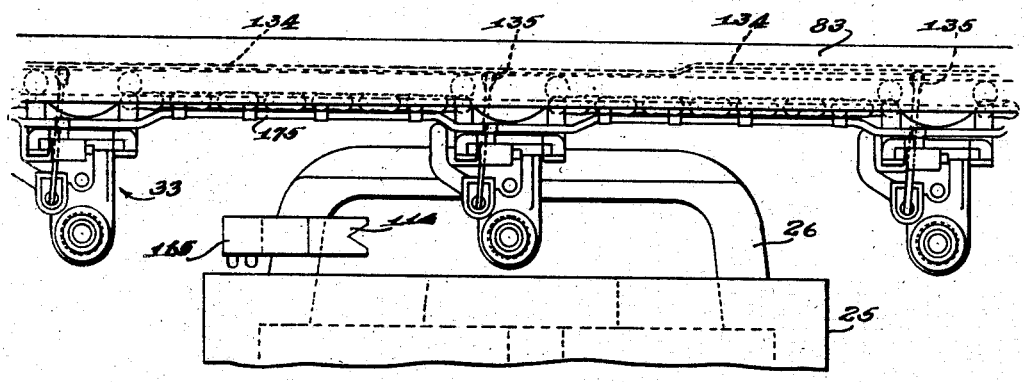
Fig. 10 is a diagrammatic plan view showing the gathering tank, neck mold units, and a chain carrier for said units.

The general arrangement of the apparatus will be understood by reference to Fig. 1 in which 25 indicates a furnace tank maintaining a continuous supply of molten glass within the forehearth or gathering tank 26. Charges of glass are drawn by suction from the tank 26 into parison molds, each including a body blank mold 27 and a neck mold 28 above and in register therewith. Blank mold units or assemblies 30, each including a blank mold, are connected in an endless series by means of an endless chain carrier 29. The carrier 29 is trained over rotary supporting devices 31 and 32, the latter being continuously driven and serving to drive the carrier so that the molds travel in succession across the gathering tank.

Figure 20:
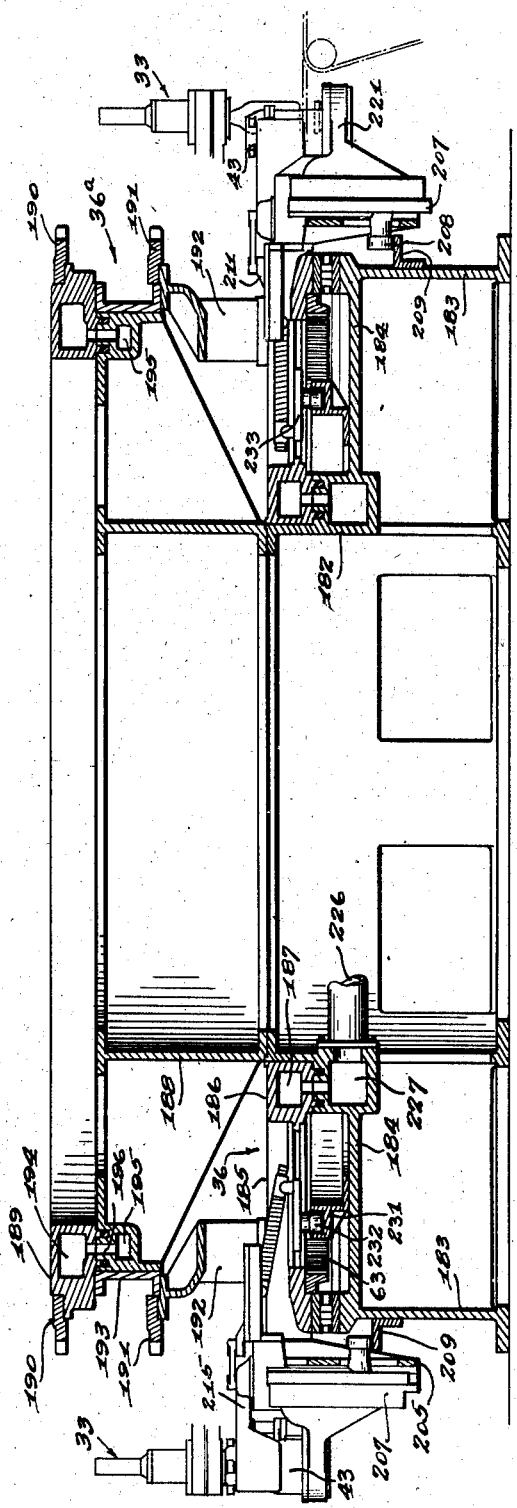
Fig. 20 is a sectional elevation showing the finishing mold carriage, the rotary support for the neck mold chain, and the stationary column on which said parts are mounted for rotation.

The neck mold assemblies or units 33, each comprising a neck mold 28, are connected to an endless chain carrier 34 trained over the rotary support 31, a similar support 35 and a rotary support 36ª mounted over and connected to rotate with a finishing mold carriage 36 (Fig. 20). Each neck mold 28 as it reaches the rotary support 31 is brought into register with a blank mold 27 therebeneath, the blank mold unit being lifted and the blank mold brought into cooperative engagement with the neck mold as hereinafter described. The blank mold when brought into position beneath the neck mold is closed about the latter and travels therewith during the gathering of a charge of glass therein and for a predetermined distance beyond the gathering tank.

Intermediate mold units 37, each comprising an intermediate mold 38, are connected by an endless chain carrier 39 trained over rotary supporting devices 41 and 42, the latter serving as a driver. Each blank mold as it approaches the rotating support 32 is opened as hereinafter described, leaving the blank or parison supported by and depending from the neck mold. Thereafter, an intermediate mold 38 closes about the parison and neck mold and travels therewith through a predetermined distance. During this travel air under pressure is supplied through the neck mold and blows the parison to hollow form within the intermediate mold. As the latter approaches the finishing mold carriage 36, it is opened, again leaving the bare parison suspended from the neck mold. Thereafter, a finishing mold 43 encloses the parison and the latter is blown therein to its final form while still supported in the neck mold.

At a predetermined time after this final blowing, the finishing mold is opened, leaving the finished bottle or article again suspended from the neck mold. This takes place before the neck mold passes beyond the finishing mold carriage. Thereafter the neck mold is opened, depositing the finished article on a conveyor 44 (Figs. 1 and 23) from which it is transferred by transfer mechanism 45 to a carrying-in conveyor 46 and from the latter to a leer conveyor within an annealing leer 47.

The driving mechanism for the several conveyors and the finishing mold carriage comprises an electric motor 50 having driving connections through speed reduction gearing within a gear box 51, to shafts 52, 53 and 54. The shaft 52 is connected by a universal joint to a shaft 55 extending to the rotary supporting and driving means 42, said shaft 55 being geared to a vertical shaft 56 (see Fig. 14) to which is keyed a driving pinion 57 engaging a ring gear 58. The latter is bolted to the rotor 42 which is mounted to revolve about a stationary column 59 and drives the intermediate mold carrier 39. The shaft 53 has a driving connection with the rotary support 32 for driving the blank mold carrier in the same manner as just described in connection with the intermediate mold carrier. The shaft 54 extends to the finishing mold carriage and is geared to a vertical drive shaft 61 to which is keyed a pinion 62 (Figs. 15 and 16) running in mesh with a ring gear 63 on the finishing mold carriage 36 for driving the latter. The carriage 36 also serves as a driving means for driving the neck mold carrier as will more fully appear hereinafter. The driving mechanism for driving the several endless chain carriers as above described, is proportioned to drive them at the same linear speed so that the movements of the several molds may be synchronized.

The endless conveyor 34 by which the neck mold units 33 are advanced, comprises upper and lower chains 64 and 65 (Fig. 2) connecting said units. Said chains are supported and guided over sprocket gears carried by the rotary members 31, 35 and 36.

Referring to Fig. 22, the device 31 comprises a stationary vertical column 66 on which is mounted for rotation a tubular column 67 which carries a series of sprocket disks 68, 69, 70 and 71. Each of said disks and corresponding disks on the chain supports 32, 35, 41 and 42, has bolted thereto sprocket plates 72 (see Fig. 7) provided with sprocket teeth 73 on which the chains run.

Each neck mold assembly 33 (see Figs. 2, 3 and 5) comprises a supporting frame 74 in the form of a vertically disposed plate. A dip frame 75, also comprising a vertical plate, is mounted for up and down movement in guideways 76 on the supporting frame 74. The frame 74 has mounted on the lower end thereof, rolls 77 which run on a track 78 formed on a rail 79 supported on a stationary frame 81. Rolls 82 on the upper end of the frame 74, run in a track formed in a guide rail 83, also supported on the frame 81. The weight of the frame 74 and mechanism carried thereby is supported mainly on the track 78, the unit being held in upright position by the guide rail 83.

The dip frame 75 has formed integrally therewith a dip head 84 extending outwardly from the lower end thereof. The neck mold 28 which may be of conventional construction, comprises partible sections mounted to swing about a pivot pin 85 on the dip head. The opening of the neck mold is effected by a rod 86 mounted to move up and down in the dip head, the lower end of said rod being tapered or wedge-shaped to enter between the neck mold arms so that when said rod is lowered, the neck mold sections are forced apart. The rod 86 is lowered by means of a cam 87 (Fig. 1) which engages a roll 88 on a slide plate 89 mounted on the frame 74. The slide plate is connected through a link 90, bell crank 91, and link 92 to the rod 86. Except when under the control of the cam 87, the rod 86 is held in its lifted position by a coil spring 93 mounted on said rod. The neck mold is closed by a U-shaped spring 93' (Fig. 12).

Each blank mold assembly 30 (see Figs. 2, 5, 6 and 7) comprises a vertical supporting frame 94 carrying at its lower end a pair of rolls 95 arranged to run on a stationary track 96 carried on the frame 81, and upper rolls 97 running in a track 98 formed on the rail 79. Mounted for up and down movement in vertical guideways 99 in the frame 94, is a mold carrying frame or plate 100. The blank mold sections are carried on arms 101 which swing about a pivot pin 102 carried on the frame 100. Opening and closing movements of the blank mold 27 are effected by means of a stationary cam 103 on which runs a cam roll 104 carried on a slide member 105 mounted to reciprocate in guideways formed in a bracket arm 106 on the plate 100.

Figure 21:
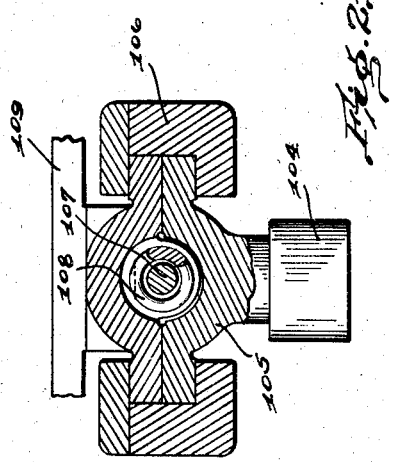
Fig. 21 is a section at the line 21—21 on Fig. 6, showing mechanism for opening and closing a blank mold.

The slide member 105 (Figs. 5, 6 and 21) comprises upper and lower sections relatively movable in the direction of their length. A rod 107 extending lengthwise of said slide member limits their relative movement in one direction. A coil spring 108 mounted on said rod bears at its opposite ends against one end of each of said sections. A yoke 109 fixed to the upper section of the slide piece 105, is connected through links 110 with the blank mold arms 101 so that reciprocating movement of the slide effects the opening and closing movements of the blank mold. The yielding means 107 provides a safety connection permitting the cam to operate the roll 104 idly in the event of an obstruction opposing the closing movements of the mold.

The frame 100 carrying the blank mold is movable up and down as before noted, said movements being under the control of a stationary cam 111 on which runs a roll 112 carried by said frame. The cam 111 is designed to lift the frame to connect it with the dip frame 75 and support the latter while the blank mold and neck mold are in register. The connecting means between the dip frame and the blank mold frame 100 comprises a pin 113 (Fig. 5), the upper end of which is adapted to engage a socket or seat in the dip head for supporting the latter and holding it in register with the blank mold frame 100. When the frame 100 passes beyond the control of the cam 111 it is lowered by gravity on to an adjustable stop 113ᵃ on the supporting frame 94.

Figure 11:
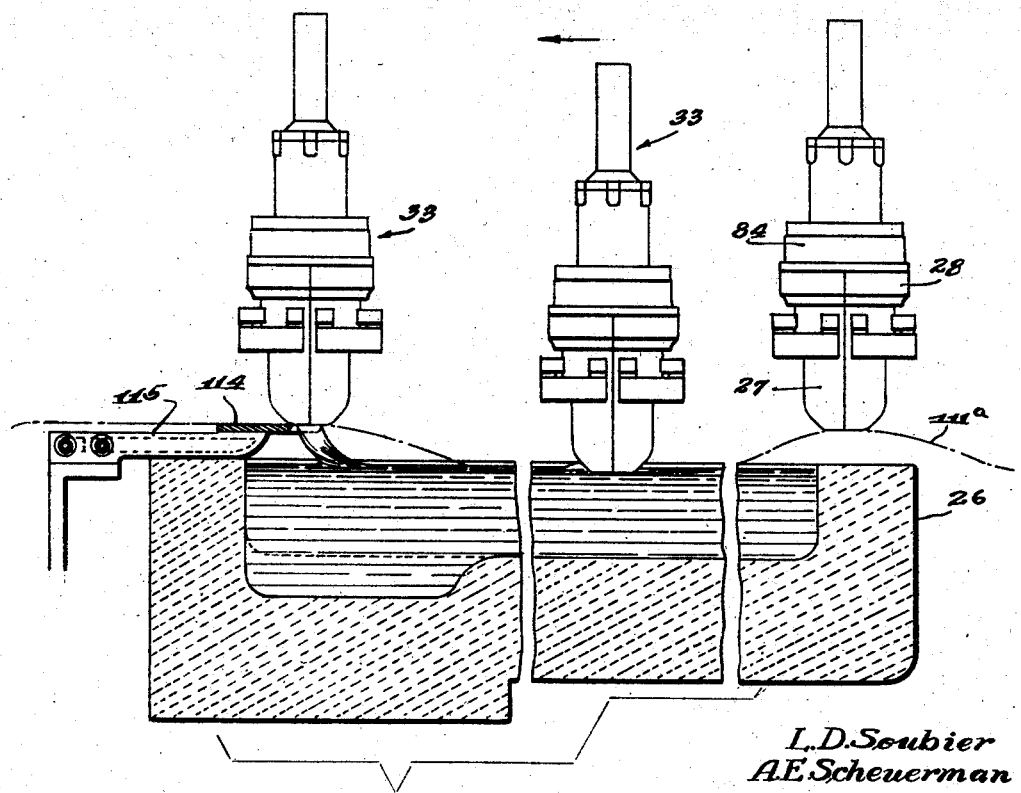
Fig. 11 is a partly diagrammatic, part sectional elevation, with parts being broken away, showing a gathering tank and indicating the path of travel of the gathering molds through the gathering zone.

The dip cam 111 is so shaped that the blank mold is caused to travel in a path indicated by the broken line 111ᵃ (Fig. 11) so that as the blank mold approaches the gathering pot 26, it is lifted over the rim of the pot and lowered into dip with the mouth of the mold in sealing contact with the molten glass and thereafter is lifted out of dip and the mouth of the mold brought in line with a knife 114 extending over the pot. The tail of molten glass is severed as the lower end of the mold wipes across the knife. The knife as shown is mounted on a stationary arm 115 which may be made hollow to permit a cooling fluid to be circulated therethrough.

When the mold is in dip, suction is applied for exhausting the air from the mold cavity so that the latter is filled with molten glass by suction in a well known manner. The vacuum system for applying suction to the molds (see Figs. 2, 3, 5, 8, 9 and 12), comprises a horizontally disposed stationary valve casing 116 located below and in front of the gathering pot and formed with a vacuum chamber 117 extending therealong. A partial vacuum is continuously maintained in said chamber by exhausting the air through a vacuum pipe 118 connected to a suction pump or the like (not shown). A series of valves 119, 119A, 119B, are positioned at intervals along the vacuum chamber 117. Each of said valves when opened connects the vacuum chamber through a passageway 121 with a port 122 in the upper face of the casing 116.

As each combined blank mold and neck mold unit traverses the gathering zone, a vacuum line is established from the vacuum chamber 117 to the mold. This vacuum line includes a channel-shaped bar or shoe 123 opening downward and carried on the blank mold frame 94. The shoe is arranged to slide along the upper surface of the casing 116 so that the channel is brought into register with the ports 122 as the mold traverses the gathering zone. The shoe 123 has a yieldable mounting on the mold frame, being carried on bolts 124 on which are mounted coil springs 125 by which said shoe is held with a yielding pressure against the stationary valve casing. At one end of the shoe is an elbow 126 connecting the channel with a vertically disposed vacuum pipe 127 comprising telescoping sections, the lower section mounted on the mold frame 94. The upper section 127ᵃ is connected by means of an arm 128 (Figs. 2 and 8) with the mold carrying frame 100. The upper end of the pipe section 127ᵃ opens into a horizontal hollow arm 129 mounted on the dip frame 75. It will be understood that the vacuum pipe or arm 129 is in sealing engagement with the pipe section 127ᵃ while the neck mold is in register with the blank mold and the dip frame supported by the blank mold carrying frame 100. The pipe section 127ᵃ includes a section 127ᵇ, said sections having a screw-threaded connection permitting adjustment of the section 127ᵇ to provide sealing contact with the part 129.

A vacuum valve 131 (see Figs. 5 and 9) mounted in the arm 129 controls a port which opens into a channel 132 extending to an air pressure and vacuum chamber 133 in the dip head. The valve 131 is operated by a cam 134 (Fig. 10) on which runs a cam roll 135 (Figs. 3 and 5) connected through a horizontal rod 136 to a bell crank 137 (see Fig. 9), the latter including an arm 138 to engage the valve stem for opening the valve. The latter is closed by a spring 139. The arm 138 is pivotally mounted to permit it to be manually moved to an inoperative position. In this manner any desired blank mold or molds may be temporarily disassociated from the vacuum line so that they will not gather charges of glass.

Each neck mold assembly includes a plunger 141 adapted to be projected into the neck mold for forming an initial blow opening in the parison. The plunger is carried by a rod 142 on which is a piston 143 movable with the rod up and down within a cylinder 144. The plunger and piston are held in their lifted position by a coil spring 145 except while vacuum is applied. When the vacuum valve 131 is opened, the air is exhausted from the chamber 133 surrounding the plunger and thereby exhausts the air from the parison mold. The vacuum line extends through that portion of the cylinder 144 beneath the plunger so that when the vacuum valve 131 is opened and the air exhausted, the piston rod and piston 143 are moved downward by atmospheric pressure against the tension of the spring 145, projecting the plunger tip into the neck mold. The plunger is held in its downward position until the vacuum is released.

As shown in Fig. 2, the valves 119, 119ᵃ and 119ᵇ are opened by a cam 146 which is formed on the channel bar 123 so that as it advances it engages the valve stems 131ᵃ and opens the valves in succession. The cam is extended to form a holding plate 147 to hold each valve open for a predetermined length of time. It will be observed that each valve is held open, with the corresponding port 122 in communication with the channel 123 until after the next succeeding valve is opened, so that the vacuum line is held open to the exhaust pipe 118 while the mold is traversing the gathering zone.

After the parison mold has gathered its charge and has passed beyond the gathering tank, the body blank mold 27 is opened as heretofore described, leaving the bare parison suspended from the neck mold until enclosed in an intermediate mold 38. Each intermediate mold unit or assembly 37 (see Figs. 12, 13 and 14), includes an intermediate mold 38 consisting of partible sections carried on arms 150 mounted to swing about a pivot pin 151 mounted in a mold carrying frame 152. Links 153 connect the mold arms with a yoke 154 connected to a slide block 155. The latter is mounted to reciprocate in guideways formed in an arm 156 attached to the frame 152.

The mold carrying frame 152 is mounted in a supporting frame 157 formed with vertical guideways 158 in which the frame 152 slides. Beneath the arm 156 is an arm 159 on the frame 157. Mounted to reciprocate in the arm 159 is a head 161 carrying a cam roll 162 adapted to run on a cam 163. A connecting pin 164 (Figs. 12 and 14) is attached to the arm 156 and extends downward therefrom into a socket 165 in the slide block 161, thereby providing a driving connection between the slide blocks 155 and 161. The connection 164, 165, permits up and down movement of the mold carrying frame 152 in the supporting frame 157. The frame 157 carries lower rolls 166 which run on a stationary track 167 and upper rolls 168 which run in a track 169.

The endless chain conveyor 39 for the intermediate mold group comprises upper and lower chains 170 and 171. The mold frame 152 is adjustable up and down relative to the frame 157 by means of a hand wheel 172 carried on a rod 173 journalled in the frame 157 and having a screw threaded connection with the frame 152. By this means the intermediate mold 38 may be accurately adjusted in a vertical direction so as to register with the neck mold 27 and interlock therewith when closed around the neck mold.

When an intermediate mold has closed around the parison, the latter is blown to hollow form within the mold. The air pressure system for blowing the parisons will now be described. A pressure pipe line 175 (see Figs. 2, 3 and 10) is mounted on the endless neck mold carrier 34, making a complete circuit therewith. As the pipe 175 is subjected to a certain amount of flexing as it travels, it is made of flexible material and may consist of any conventional or approved type of flexible pipe or hose. Pressure valves 176 individual to the neck molds are provided in the pressure line 175, said valves being mounted on the neck mold frames 74. Each pressure valve is operated in turn by a stationary cam 177 which engages a cam roll 178 on a rock arm 179 for rocking an arm 180 which engages the valve stem and operates the latter for opening the valve. This supplies air pressure from the line 175 through a pressure pipe 181 extending downwardly from the valve and opening through the channel 132 (Fig. 5) into the cylinder 144, thereby supplying air pressure through the neck mold for blowing the parison.

The finishing mold carriage 36 (see Figs. 15, 16 and 20) is mounted to rotate about the axis of a stationary supporting frame comprising a central drum section 182 (Fig. 20), an outer annular wall 183, and a horizontal connecting web or plate 184. The carriage comprises horizontal arms 185 radiating from a hub 186 surrounding the drum 182 and of hollow formation to provide an annular chamber 187 through which cooling air is supplied to the molds as hereinafter described. Each arm 185 carries a finishing mold unit or assembly.

Above the drum 182 is mounted a second drum 188 which provides a support for an annular rotating frame or carrier 189 on which are mounted upper and lower sprocket plates 190 and 191 over which the neck mold conveyor chains are trained. Brackets 192 and 193 are bolted together and are secured respectively to the finishing mold carriage 36 and the frame 189 so that the latter is rigidly connected to and rotates with the finishing mold carriage. The ring frame 189 is of hollow formation to provide an annular air pressure chamber 194 which overlies a similar pressure chamber 195 formed in the stationary frame. The chamber 195 is in communication at all times with the chamber 194 through ports 196. Air under pressure is supplied through a pipe 197 (Fig. 15) to the pressure chambers.

The pressure chamber 194 is maintained in constant communication with the air pressure line 175 on the neck mold conveyor by the following means. Each neck mold frame 74 has mounted thereon a connector section 198 (Figs. 4 and 15) with an air passageway extending therethrough and a ball check valve 198ª housed therein. The connector 198 includes an adjustable section 199 with a flared open end 199ª. The ring 189 carries tubular connector sections 200 which are brought into alignment with the sections 198 while the corresponding neck mold units are traveling around the finishing mold carriage. Each connector section 200 as it is brought into line with the complementary section 198, makes sealing contact therewith and is moved rearwardly against the tension of a spring 201. This rearward movement of the connector 200 causes a valve 202 carried thereby, to open a port to the pressure chamber 194, placing the latter in communication through the coupling members 200, 198 and a pipe section 203, with the pressure pipe line 175. Air pressure is thus constantly maintained within the line 175, it being noted that a plurality of the neck mold units is at all times traveling in engagement with the rotating frame 189.

A finishing mold group as shown in Figs. 15 to 19 inclusive will now be described. It comprises a supporting frame 205 having a fixed mounting on an arm 185 of the mold carriage, said frame including vertical guideways 206 in which a mold carrying frame 207 is mounted for up and down movement. The frame 207 carries a cam roll 208 running on a cam track by which the up and down movements of the mold are controlled. The finishing mold 43 comprises partible sections hinged to swing about a pivot pin 209 for opening and closing the mold. The mechanism for opening and closing the mold comprises a slide plate 211 cam operated as hereinafter described, said slide plate mounted to reciprocate radially of the mold carriage in guideways 212 formed in an arm 213 fixed to and extending rearwardly from the frame 207. The slide plate 211 is connected through links 214 with lever arms 215 pivoted to swing about the axis of a pin 216, the arms 215 being connected through links 217 with the mold sections.

The pin 216 is adapted to engage the neck mold frame positioned thereover and support the neck mold assembly while the latter is traveling around the axis of the finishing mold carriage, with the neck mold and finishing mold in register. It will be noted that at this time the rolls 77 and 82 on the neck mold frame are disengaged from their stationary tracks. The supporting pin 216 comprises a vertically adjustable section 216ᵃ permitting the finishing mold to be accurately adjusted to the neck mold. When the finishing mold is closed, it surrounds and has an interlocking connection with the neck mold.

The finishing mold sections are supported on a bottom plate 218 carrying a mold bottom 219. Said bottom plate is in turn mounted on a hollow bracket arm 221 carried on a vertical rod 222 supported on the frame 207. The bracket 221 is adjustable vertically to accommodate finishing molds of different lengths. The means for adjusting said bracket comprises a hand wheel 223 (Figs. 17 and 18) on a worm shaft 224 which engages a worm wheel 225 threaded on the shaft 222.

Cooling air is supplied to the finishing molds through a pipe 226 (Fig. 20) from any suitable source, said pipe opening into an annular chamber 227 formed integral with the drum 182, said chamber being in communication with the rotating chamber 187. The spider arms 185 of the mold carriage are of hollow formation to provide conduits 188 (see Fig. 19) extending from the chamber 187 to the mold carrying frames 205. The latter are formed with passageways 228 extending from the conduits 188 and communicating through port openings 229 with passageways 230 in the frame 207 through which cooling air is directed to blowers for cooling the mold sections and also to the hollow bracket arms 221 supplying cooling air for the mold bottoms.

After a parison has been blown in an intermediate mold 38, the latter is opened as heretofore described, leaving the parison suspended in the neck mold and as the latter advances into engagement with the frame 189 which rotates with the finishing mold carriage, the finishing mold is closed about the parison which is then blown to its finished form. The means for closing the finishing mold includes a stationary cam track 231 (Figs. 15 and 16) on which runs a cam roll 232 on a slide plate 233 mounted to reciprocate in guides 234 fixed to and extending radially of the mold carriage. The slide plate 233 has an operating connection with the slide plate 211, said connection including a rod 235 and coil spring 236. This provides a yieldable connection of usual construction, serving as a safety means to permit operation of the cam slide 233 independently of the mold closing movement when any obstruction or abnormal conditions prevent the mold from closing.

When the finishing mold has closed around the parison, the pressure valve 176 is actuated by its cam 177 as hereinbefore described for supplying blowing air to the finishing mold so that the parison is blown to its finished form. A valve 237 (Fig. 15) in the pipe 181 may be closed manually to prevent blowing of the parison in the finishing mold, or to prevent blowing air from being supplied through any neck mold unit which is not being used.

Modifications may be resorted to within the spirit and scope of our invention.

We claim:

1. Apparatus for forming hollow glass articles, comprising a series of neck molds, means connecting said neck molds in an endless chain, an endless chain of body blank molds, an endless chain of blow molds, means for guiding said chains of molds in paths comprising parallel straight line portions, means for driving said chains and causing the body blank molds to travel in register with the neck molds along a straight line portion of the path of travel of the neck molds, means for causing the blow molds to travel in register with the neck molds along a succeeding straight line portion of the path of travel of the neck molds, means providing a pool of molten glass beneath the body blank molds, means for introducing charges of glass by suction from said pool into the combined neck molds and blank molds, and means for blowing the parisons in said blow molds while the latter travel in register with the neck molds and while the parisons are supported in the neck molds.

2. Apparatus for forming hollow glass articles, comprising a series of neck molds, means connecting said neck molds in an endless chain, an endless chain of body blank molds, an endless chain of blow molds, means for guiding said chains of molds in paths comprising parallel straight line portions, means for driving said chains and causing the body blank molds to travel in register with the neck molds along a straight line portion of the path of travel of the neck molds, means for causing the blow molds to travel in register with the neck molds along a succeeding straight line portion of the path of travel of the neck molds, means providing a pool of molten glass beneath the body blank molds, means for introducing charges of glass by suction from said pool into the combined neck molds and blank molds, means for blowing the parisons in said blow molds while the latter travel in register with the neck molds and while the parisons are supported in the neck molds, finishing molds, means for causing them to travel in register with the neck molds after the parisons have been blown in said blow molds, and means to further blow the parisons in said finishing molds.

3. The combination of an endless chain of neck molds, an endless chain of body blank molds, an endless chain of intermediate molds, a finishing mold carriage, finishing molds thereon, means for rotating said carriage and for driving said chains of molds, means for guiding said chains of molds in paths comprising parallel straight line portions, a support connected to rotate with the finishing mold carriage and over which the chain of neck molds is trained, said parts being so arranged that the blank molds and intermediate molds register in turn with the neck molds during succeeding portions of the travel of the neck molds in their said straight line path and the finishing molds thereafter register with the neck molds, means for introducing charges of glass into the combined neck molds and blank molds, and means for blowing the charges in the intermediate and finishing molds.

4. In an apparatus for forming hollow glass articles, the combination of an endless chain of neck mold units, each said unit comprising a partible neck mold, a supporting frame and mechanism for opening and closing the neck mold, an endless chain of blank mold units, each comprising a partible blank mold, a supporting frame therefor and mechanism for opening and closing the blank mold, means for driving each said chain of mold units in a closed path including a straight line section and causing each blank mold to register with a neck mold during a portion of its travel in a straight line, stationary rails on which the neck mold supporting frame runs and by which its weight is supported during its travel along a portion of its said path of travel, and means for transferring the support of the neck mold unit to the blank mold supporting frame while the blank mold and neck mold are traveling in register in a straight line.

5. The combination of an endless chain of neck mold units arranged to travel in a closed path including a straight line portion, each said unit including a partible neck mold, a dip frame on which it is carried and means for opening and closing the neck mold, an endless chain of blank mold units arranged to travel in a closed path including a straight line portion and each comprising a blank mold and a carrying frame, the blank molds being arranged to be brought in succession beneath and into register with corresponding neck molds and to travel in register therewith, stationary tracks on which the neck mold units run and by which they are supported during a portion of their travel, and means on the blank mold frames for engaging the dip frames, and supporting the latter during a portion of their travel while the blank molds and neck molds are in register and traveling in a straight line.

6. The combination of an endless chain of neck mold units arranged to travel in a closed path including a straight line portion, each said unit including a partible neck mold, a dip frame on which it is carried and means for opening and closing the neck mold, an endless chain of blank mold units arranged to travel in a closed path including a straight line portion and each comprising a blank mold and a carrying frame, the blank molds being arranged to be brought in succession beneath and into register with corresponding neck molds and to travel in register therewith, stationary tracks on which the neck mold units run and by which they are supported during a portion of their travel, means on the blank mold frames for engaging the dip frames, and supporting the latter during a portion of their travel while the blank molds and neck molds are in register and traveling in a straight line, a gathering pot over which the molds travel, and means for lowering and lifting the blank mold carrying frames while the dip frames and neck molds are supported thereby and thereby lowering and lifting the combined neck and blank molds into and out of dip in the gathering pot.

7. The combination of an endless chain of neck mold units arranged to travel in a closed path including a straight line portion, each said unit including a partible neck mold, a dip frame on which it is carried and means for opening and closing the neck mold, an endless chain of blank mold units arranged to travel in a closed path including a straight line portion and each comprising a blank mold and a carrying frame, the blank molds being arranged to be brought in succession beneath and into register with corresponding neck molds and to travel in register therewith, stationary tracks on which the neck mold units run and by which they are supported during a portion of their travel, means on the blank mold frames for engaging the dip frames, and supporting the latter during a portion of their travel while the blank molds and neck molds are in register and traveling in a straight line, a gathering pot over which the molds travel, and means for lowering and lifting the blank mold carrying frames while the dip frames and neck molds are supported thereby and thereby lowering and lifting the combined neck and blank molds into and out of dip in the gathering pot, said last mentioned means comprising a stationary cam track and a roll on the blank mold carrying frame running on said track.

8. Apparatus for forming hollow glass articles, comprising an endless chain of mold units, means for driving said chain and causing the said units to travel horizontally in a closed path, each said unit comprising a supporting frame, a mold carrying frame movable up and down in said supporting frame, and a partible body mold carried on said carrying frame, stationary rails on which said supporting frames are supported during their travel, a stationary cam operable to lift and lower said carrying frames and molds while their supporting frames travel on said rails, an endless chain of neck molds arranged to travel in a closed path and bring the neck molds above and into register with said body molds during a portion of their travel, means for supporting the neck molds during a portion of their travel, and means to transfer the support of the neck molds to said carrying frames and thereby cause the neck molds to be lifted and lowered with said body molds and their carrying frames.

9. The combination of an endless chain of molds, means for continuously driving said chain and causing the molds to travel in a closed non-circular path, means for supporting and guiding said chain including a supporting element rotatable about a stationary axis and around which said chain of molds is trained, an air pressure pipe line carried by said chain of molds and extending througout the length thereof, said supporting element comprising an air pressure chamber, and means for maintaining continuous communication between said chamber and said pipe line including pipe coupling members connected to said pipe line and positioned at intervals therealong and cooperating coupling members mounted on said supporting element and brought in succession into register with said first mentioned coupling members by the rotation of said supporting element, said last mentioned means comprising valves automatically actuated by the coupling members and operative to open said pressure chamber to said pipe line.

10. The combination of an endless chain of molds, means for continuously driving said chain and causing the molds to travel in a closed path, means for supporting and guiding said chain including a supporting element rotatable about a stationary axis and around which said chain of molds is trained, an air pressure pipe line carried by said chain of molds and extending throughout the length thereof, means for introducing charges of glass into the molds, branch lines extending from said pipe line to the molds, valves individual to the molds and controlling the supply of air pressure from the pipe line to the molds, automatic means for actuating said valves for supplying blowing air to the molds, means for maintaining continuous pressure within said pipe line, including a pressure chamber on said supporting element, pipe coupling elements carried with the pipe line and cooperating coupling elements on said supporting element and brought in succession into engagement with said first mentioned coupling elements, and means for establishing communication between the pressure chamber and said pipe line through each pair of engaged coupling elements.

11. Apparatus for forming hollow glass articles, comprising in combination an endless chain of molds mounted to travel in a closed path, an air pressure pipe line extending along said chain, automatic means for maintaining continuous air pressure in said pipe line throughout its length, valves individual to the molds and controlling the supply of air from the pipe line to the molds, and automatic means for actuating the valves.

12. Apparatus for forming hollow glass articles, comprising an endless chain of neck molds, rotary supporting devices over which said chain is trained, means for driving said chain of neck molds and causing them to travel in the endless path defined by said chain, said path including a straight line section extending between two of said supporting devices, an endless chain of blank molds trained over one of said rotary supporting devices, said blank molds arranged to travel beneath and in register with the neck molds along a portion of said straight line section, a finishing mold carriage connected to and rotating as a unit with one of said rotary supporting devices, and finishing molds on said carriage arranged to travel beneath and in register with the neck molds along another portion of the path of travel of the neck molds.

13. Apparatus for forming hollow glass articles, comprising an endless chain of neck molds, rotary supporting devices over which said chain is trained, means for driving said chain of neck molds and causing them to travel in the endless path defined by said chain, said path including a straight line section extending between two of said supporting devices, an endless chain of blank molds trained over one of said rotary supporting devices, said blank molds arranged to travel beneath and in register with the neck molds along a portion of said straight line section, a finishing mold carriage connected to and rotating as a unit with one of said rotary supporting devices, finishing molds on said carriage arranged to travel beneath and in register with the neck molds along another portion of the path of travel of the neck molds, means for supplying charges of molten glass to the combined neck molds and blank molds while traveling in said straight line, means for opening the blank molds and leaving the parisons suspended from the neck molds, means for closing the finishing molds about the parisons, and means for blowing the parisons within the finishing molds.

14. Apparatus for forming hollow glass articles, comprising an endless chain of neck molds, rotary supporting devices over which said chain is trained, means for driving said chain of neck molds and causing them to travel in the endless path defined by said chain, said path including a straight line section extending between two of said supporting devices, an endless chain of blank molds trained over one of said rotary supporting devices, said blank molds arranged to travel beneath and in register with the neck molds along a portion of said straight line section, a finishing mold carriage connected to and rotating as a unit with one of said rotary supporting devices, finishing molds on said carriage arranged to travel beneath and in register with the neck molds along another portion of the path of travel of the neck molds, a chain of intermediate molds, means for supporting and driving it with the intermediate molds arranged to travel beneath and in register with the neck molds along a portion of said straight line section between the blank mold path and the finishing mold carriage, means for closing the intermediate molds about parisons suspended from the neck molds, and means for blowing the parisons in the intermediate molds.

15. Apparatus for forming hollow glass articles, comprising an endless chain of neck molds, rotary supporting devices over which said chain is trained, means for driving said chain of neck molds and causing them to travel in the endless path defined by said chain, said path including a straight line section extending between two of said supporting devices, an endless chain of blank molds trained over one of said rotary supporting devices, said blank molds arranged to travel beneath and in register with the neck molds along a straight line portion of the path of travel of the neck molds, a finishing mold carriage connected to and rotating as a unit with one of said rotary supporting devices, finishing molds on said carriage arranged to travel beneath and in register with the neck molds along another portion of the path of travel of the neck molds, a container for molten glass, means for dipping the blank molds into the glass while traveling together with neck molds, means for drawing charges of glass by suction into the molds and forming parisons therein, and means for blowing the parisons within the finishing molds.

16. Apparatus for forming hollow glass articles, comprising an endless chain of molds, horizontally spaced supporting devices over which said chain is trained, means for driving said chain and thereby causing the molds to travel in a closed path, means providing an air pressure pipe line carried by said chain and serving as an air pressure reservoir common to all of the molds, an annular pressure chamber carried by one of said rotary supporting devices, branch pipes carried by said chain of molds and located at intervals along said chain and each opening into said pipe line, check valves in said branch pipes, and automatic means for establishing communication from said annular pressure chamber to said pipe line through each of said branch pipes as the latter advances with said pressure chamber.

17. The combination of an endless chain of neck mold supporting frames and neck molds thereon, an endless chain of blank mold supporting frames and body blank molds thereon, an endless chain of intermediate molds, a finishing mold carriage, finishing molds thereon, means for rotating said carriage and for driving said chains of molds and supporting frames in paths comprising parallel straight line portions, a support connected to rotate with the finishing mold carriage and over which the chain of neck molds is trained, said parts being so arranged that the blank molds and intermediate molds register in turn with the neck molds during succeeding portions of the travel of the neck molds in their said straight line path and the finishing molds thereafter register with the neck molds, means for moving the blank molds relative to their supporting frames to a charge gathering position while said supporting frames are moving in a straight line, means for introducing charges of glass into the combined neck molds and blank molds, and means for blowing the charges in the intermediate and finishing molds.

LEONARD D. SOUBIER.
AUGUST E. SCHEUERMAN.